United States Patent [19]

Morgan et al.

[11] 4,449,747
[45] May 22, 1984

[54] INSULATING DASHBOARD COVER HAVING ANTIGLARE AND HEAT RESISTANT CHARACTERISTICS

[76] Inventors: Martin B. Morgan, 2609 W. Southern, Sp. 309, Tempe, Ariz. 85282; Marvin C. Morgan, 3232 E. Coronado, Phoenix, Ariz. 85008; John W. Linde, 11611 N. 50 Ave., Glendale, Ariz. 85304

[21] Appl. No.: 294,010

[22] Filed: Aug. 18, 1981

[51] Int. Cl.³ .............................................. B60J 3/00
[52] U.S. Cl. ................................... 296/97 E; 280/752
[58] Field of Search ................. 180/90; 296/39 A, 70, 296/72, 74, 97 R; 280/752

[56] References Cited

U.S. PATENT DOCUMENTS

| 2,207,224 | 7/1940 | Meares | 296/97 E |
| 2,560,009 | 7/1951 | Straith | 280/752 |
| 2,844,387 | 7/1958 | Shaw | 280/752 |
| 2,991,119 | 7/1961 | Young | 296/97 E |
| 3,896,448 | 7/1975 | Killen et al. | 180/90 |

FOREIGN PATENT DOCUMENTS

| 2338421 | 2/1975 | Fed. Rep. of Germany | 296/97 R |
| 657310 | 11/1963 | Italy | 280/752 |

Primary Examiner—Joseph F. Peters, Jr.
Assistant Examiner—Ross Weaver

[57] ABSTRACT

A dashboard cover is made of a polyester foam rubber backed upholstery material. Spots of adhesive is placed between the dashboard and cover to semi-permanently secure the cover to the dashboard. The cover is cut from an aluminum foil pattern which is formed by first placing tin foil on the exterior of the windshield and contouring it generally to the shape of the dashboard. The contoured aluminum is then placed on the dashboard and trimmed. The foil pattern is traced onto permanent pattern material.

6 Claims, 4 Drawing Figures

INSULATING DASHBOARD COVER HAVING ANTIGLARE AND HEAT RESISTANT CHARACTERISTICS

BACKGROUND OF THE INVENTION

1. Field of the Invention

This invention relates to a dashboard cover made of polyester foam rubber bonded to fabric and to a method of making same.

2. Description of the Prior Art

As is well known, dashboards are generally padded with high density materials so as to minimize the possibility of injuries to the occupants of a vehicle (i.e. auto, truck, aircraft, boat, etc.). Unfortunately, such padded dashboards and under dash components will deteriorate (i.e. fade, split, etc.) very rapidly when constantly exposed to high temperatures and intense sunlight. These high density dashboard materials also tend to have a dusty appearance and reflect glare and heat to the vehicle interior and occupants.

SUMMARY OF THE INVENTION

It is an object of the present invention to provide a dashboard cover which is simple and which can be installed without much experience or tools.

According to a broad aspect of the invention, there is provided a method of covering a dashboard, comprising: placing a layer of foil on the exterior surface of a vehicle windshield; contouring the layer of foil to the general shape of the vehicle's dashboard which is visible through the windshield; placing the countoured layer of foil on said dashboard; trimming the contoured layer of foil to form a pattern; placing said pattern on a covering material; and cutting said covering material to form a cover for said dashboard.

According to a further aspect of the invention, there is provided a dashboard cover, comprising: an upper layer of fabric and a lower layer of foam rubber bonded to said upper layer.

The above and other objects, features and advantages of the present invention will be better understood from the following detailed description taken in conjunction with the accompanying drawings, in which:

BRIEF DESCRIPTION OF THE DRAWINGS

FIG. 1 illustrates the windshield 2 and dashboard 4 of, for example, a typical automobile 6 (FIG. 4). The inventive dashboard cover 8 is positioned on dashboard 4 in a semipermanent manner as will be described below. As can be seen, the dashboard cover is custom made so as to accommodate the particular characteristics of the dashboard. For example, the dashboard cover 8 shown in FIG. 1 has a cutout 10 so as not to cover a vent 12. Further, the dashboard cover may be easily equipped with openings therein such as is shown at 14 for accommodating glasses or cups, or pockets such as is shown at 16 into which maps and the like may be placed and stored.

Referring to FIG. 2 which is a cross-sectional view of the inventive dashboard cover, it can be seen that an upper layer 18 of, for example, polyester fabric of any desired color is backed with a layer of foam rubber 20. The foam rubber aids in the positioning of the cover and helps maintain the cover in position. The border of the cover is finished with a braid fabric such as is shown at 22.

Figure 1:
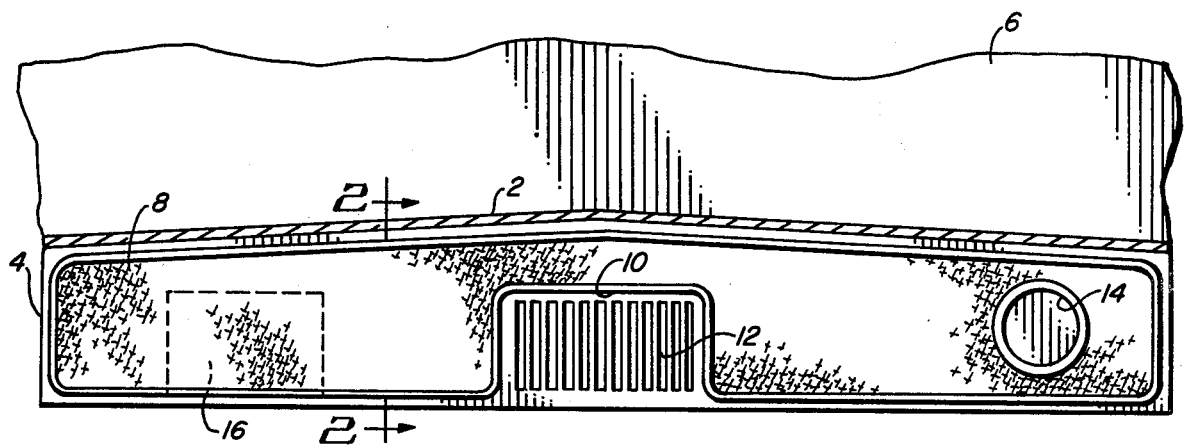
FIG. 1 shows the inventive dashboard cover positioned on the dashboard of a vehicle.
Figure 2:
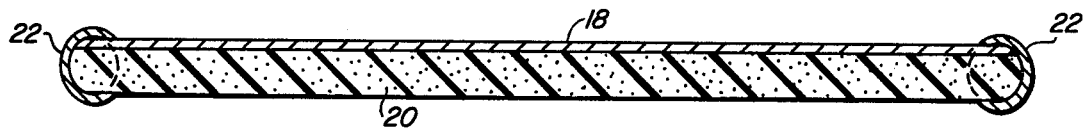
FIG. 2 is a cross sectional view of the dashboard cover shown in FIG. 1.
Figure 3:
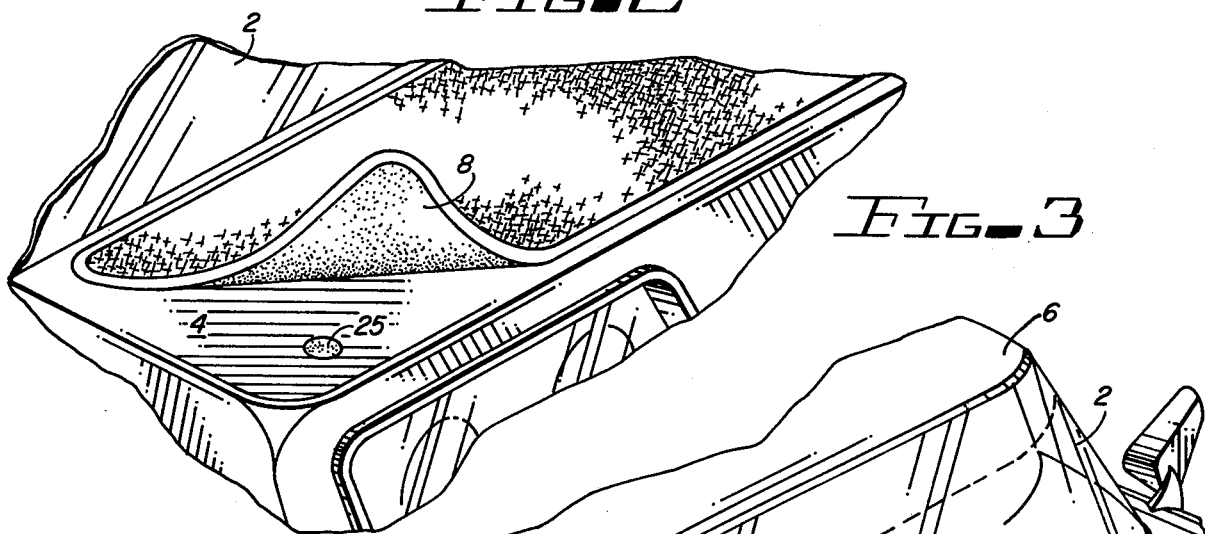
FIG. 3 illustrates how the dashboard cover is adhered to the dashboard in a semi-permanent manner.

In order to semi-permanently fix the cover 8 to dashboard 4, spots of adhesive material 24 (shown in FIG. 3) are deposited approximately one foot apart. The cover is then pressed down on the adhesive. The use of the adhesive material 24 is very important because of the nature of the adhesive in this application since the adhesive functions to provide enough of a gripping action to hold down the cover to overcome wind resistance when windows are open but, not enough adhesion to prevent relatively easy removal, by hand, of the dashboard cover 8 without tearing the cover 8 off or in pieces. A suitable adhesive for this purpose is, for example, Fun-Tak which is a product manufactured by Permabond. In this manner, cover 8 is secured on dashboard 4 but is easily removable by merely lifting. The adhesive mentioned above is easily removed.

Figure 4:
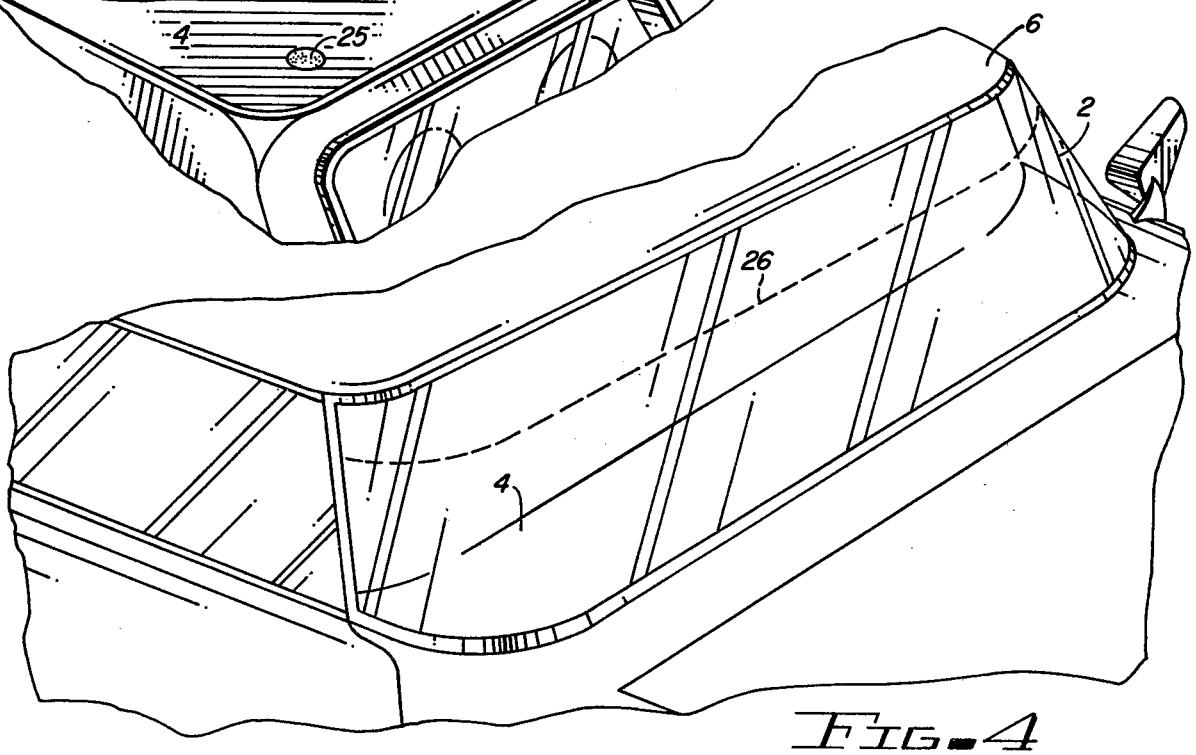
FIG. 4 illustrates how a pattern for the dashboard cover is formed on the windshield of an automobile using foil.

The inventive dashboard cover is manufactured as follows; First, referring to FIG. 4, aluminum or other suitable foil is placed on the exterior of the windshield 2 of a vehicle 6. As can be seen, the dashboard 4 is visible through the windshield and the aluminum foil 26 may be contoured so as to generally follow the shape of the dashboard. The aluminum foil is then placed on the dashboard for contouring and fine trimming after which the aluminum foil is used as a pattern for cutting the permanent polyester foam-backed material pattern.

The above description is given by way of example only. Changes in form and details may be made by one skilled in the art without departing from the scope of the invention as defined by the appended claims. For example, a cover constructed like the dashboard cover 8 can be used as a cover in the rear portion of an automobile, as a cover in boats, aircraft, trucks, and other types of vehicle applications. Thus, the term dashboard cover, as used herein and in the patent claims, is intended to cover the other above identified applications.

What is claimed is:

1. A method of covering a dashboard, comprising:
   placing a layer of foil on the exterior surface of a vehicle windshield;
   contouring the layer of foil to the general shape of the vehicle's dashboard which is visible through the windshield;
   placing the contoured layer of foil on said dashboard;
   trimming the contoured layer of foil to form a pattern;
   placing said pattern on a covering material; and
   cutting said covering material to form a cover for said dashboard.

2. A method according to claim 1 further including placing spots of adhesive on said dashboard to hold said cover.

3. A method according to claim 2 wherein said spots are approximately one foot apart.

4. A method according to claim 1 wherein said covering material is a foam rubber backed fabric.

5. A method according to claim 1 further comprising cutting at least one aperture in said cover.

6. A method according to claim 1 further comprising forming at least one pocket in said cover.

* * * * *